United States Patent [19]

Kido

[11] Patent Number: 4,943,074
[45] Date of Patent: Jul. 24, 1990

[54] STEERING MECHANISM FOR VEHICLE REAR WHEELS

[75] Inventor: Tomoyuki Kido, Osaka, Japan

[73] Assignee: Diahatsu Motor Co., Ltd., Osaka, Japan

[21] Appl. No.: 287,289

[22] Filed: Dec. 21, 1988

[30] Foreign Application Priority Data

Dec. 28, 1987 [JP] Japan .................. 62-335827

[51] Int. Cl.5 ............................. B62D 7/00
[52] U.S. Cl. ....................... 280/91; 180/140
[58] Field of Search ........... 280/91, 771, 99; 74/39, 74/40, 42, 43, 89, 50, 89.16; 180/140, 234, 236

[56] References Cited

U.S. PATENT DOCUMENTS

| | | | |
|---|---|---|---|
| 4,295,657 | 10/1981 | Sano | 280/91 |
| 4,522,416 | 6/1985 | Sano | 280/91 |
| 4,557,493 | 12/1985 | Sano | 280/91 |
| 4,558,877 | 12/1985 | Furukawa | 280/91 |
| 4,691,932 | 9/1987 | Hyodo | 280/91 |
| 4,706,978 | 11/1987 | Ito | 280/91 |
| 4,787,645 | 11/1988 | Ohbayashi | 280/91 |

FOREIGN PATENT DOCUMENTS 6397468 4/1988 Japan .
6397469 4/1988 Japan .
2123768 2/1984 United Kingdom .

Primary Examiner—Richard A. Bertsch
Attorney, Agent, or Firm—William H. Eilberg

[57] ABSTRACT

A steering mechanism for vehicle rear wheels comprises an input shaft rotated in response to rotation of a vehicle steering wheel. A cam member is connected to the input shaft for rotation therewith. The cam member is interposed between a pair of cam followers spaced widthwise of the vehicle and held by a follower support which is linearly movable widthwise of the vehicle when the input shaft is rotated. Such movement of the follower support is transmitted to a knuckle arm of each rear wheel by means of a tie member, whereby the orientation of the rear wheel is controlled in dependence upon front wheel steering by suitably selecting a cam profile for the cam member.

14 Claims, 7 Drawing Sheets

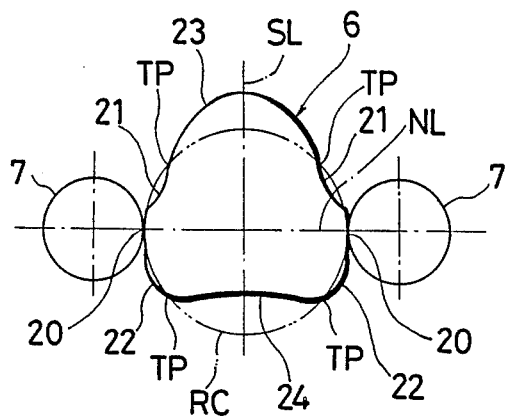
Fig. 3a
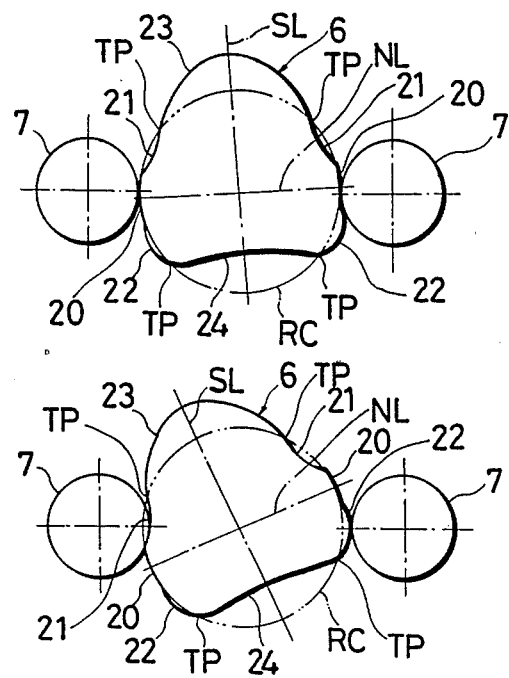
Fig. 3b
Fig. 3c
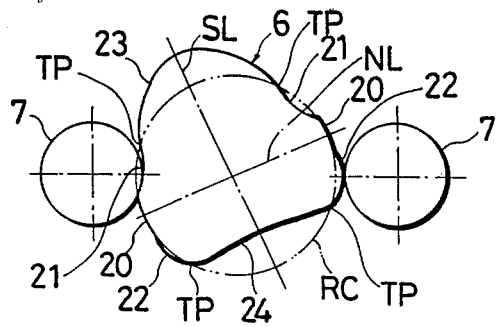
Fig. 3d
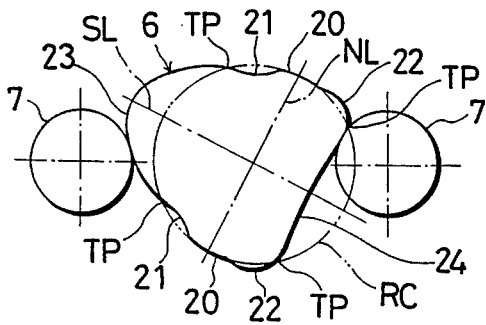

STEERING MECHANISM FOR VEHICLE REAR WHEELS

BACKGROUND OF THE INVENTION

1. Field of the Invention

This invention relates generally to a steering system for automotive vehicles. It more particularly relates to a rear wheel steering mechanism which can be advantageously incorporated into a four-wheel steering system (4WS) for automobiles.

2. Description of the Prior Art

As is well known, various attempts have long been made to improve controllability of automobiles. The four-wheel steering system is one e8ample which has resulted from such atempts.

In designing the four-wheel steering system, the following points must be taken into consideration.

(1) High speed driving rarely requires large angle rotation of the steering wheel because such driving is used principally for driving on straig(t roads or in gentqpp (3) When driving in a corner particularly at high speeds, the car is subjected to a larger centrifugal force which may cause lateral slippage.

(4) Lateral slippage of the car can be prevented or reduced by orienting or pivoting the rear wheels in the same direction as the front wheels Such pivotal movement of the rear wheels will be hereafter called "same phase pivotal movement".

(5) The turning radius of the car can be reduced by orienting or pivoting the rear wheels in the opposite direction relative to the front wheels Such pivotal movement of the rear wheels will be hereafter called "opposite phase pivotal movement".

In view of these points, U.S. Pat. No. 4,295,657 to Sano et al discloses a four-wheel steering system for a vehicle which comprises a rear wheel steering mechanism mechanically connected to a front wheel steering mechanism. More specifically, the rear wheel steering mechanism includes a fixed housing in which is slidably guided a cam plate connected through a link rod to a knuckle arm of one front wheel. The link rod converts the pivotal steering movement of that front wheel into the sliding movement of the cam plate lengthwise of the vehicle. The cam plate is formed with a snaky or tortuous cam groove in which is slidably fitted a guide pin connected through a tie rod to the knuckle arms of the rear wheels. Thus, the movement of the cam plate lengthwise of the vehicle forces the pin to move widthwise of the vehicle, thereby causing the rear wheels to pivot for directional change.

The tortuous cam groove is so shaped that the rear wheels make same phase pivotal movement when the steering wheel is rotated through less than a specified angle, whereas the rear wheels make opposite phase pivotal movement when the steering wheel is rotated through more than the specified angle. Thus, with the four wheel steering system of this U.S. patent, it is possible to achieve a smaller turning radius of the vehicle during low speed driving while ensuring a increased safety during high speed driving.

The four-wheel steering system of the above U.S. patent, however, is disadvantageous in that a wasted large force is developed between the guide pin and the cam groove when converting the movement of the cam plate lengthwise of the vehicle into the movement of the pin or the tie rod widthwise of the vehicle. Further, such a manner of movement conversion may result in damage of the cam plate or the guide pin particularly when the rear wheels to be pivotally moved are heavily loaded.

British Patent Application Laid-open No. 2,123,768 discloses another four-wheel steering system for a vehicle which comprises a rotary member adapted to rotate about a rotational axis extending lengthwise of the vehicle in response to the rotation of the steering wheel. The rotary member carries a crank pin eccentric relative to the rotational axis of the rotary member. The crank pin is connected to a link arm extending widthwise of the vehicle and supported to move pivotally as well as widthwise of the vehicle upon cranking or eccentric rotation of the crank pin. The movement of the link arm widthwise of the vehicle is transmitted to the knuckle arms of the rear wheels to cause steering pivotal movement thereof. Basically, a half rotation of the rotary member corresponds to the same phase pivotal movement of the rear wheels, whereas a further half rotation of the rotary member is equivalent to the opposite phase pivotal movement of the rear wheels. Therefore, a turning point from the same phase pivotal movement to the opposite phase pivotal movement is at the point of half rotation of the rotary member.

With the four-wheel steering system of this laid-open British application, it is possible to change the amount of steering pivotal movement of the rear wheels by varying the eccentricity of the crank pin. However, it is virtually impossible to adjust the amount of the same phase pivotal movement independently of the amount of the opposite phase pivotal movement. Similarly, it is also impossible to adjust the timing of the turning point. Further, the link arm connected to the crank pin is pivotally moved, which is a wasted movement not utilized for steering pivotal movement of the rear wheels.

U.S. Pat. No. 4,522,416 to Sano et al also teaches a four-wheel steering system which is similar to the above British patent and therefore has similar disadvantages.

SUMMARY OF THE INVENTION

It is, therefore, an object of the invention to provide a steering mechanism for vehicle rear wheels which enables easy alteration of rear wheel steering mode while prohibiting wasted movements and mechanical strength problems.

Another object of the invention is to utilize vehicle conditions or postures for automatic steering of the rear wheels, thereby achieving an improved controllability of the vehicle.

A further object of the invention is to provide an optimum cam profile for a cam member incorporated into the rear wheel steering mechanism.

According to the invention, there is provided a steering mechanism for vehicle rear wheels comprising: an input shaft rotated in response to rotation of a vehicle steering wheel; a cam member connected to the input shaft for rotation therewith; a follower support for holding a pair of cam followers spaced widthwise of the vehicle with the cam member interposed therebetween, the support being rectilinearly movable widthwise of the vehicle when the input shaft is rotated; and a tie member connecting the follower support to a knuckle arm of each rear wheel. , With the arrangement described, the follower support makes a specific movement provided by the cam profile of the cam member to cause corresponding steering movement of the rear wheels, so that the rear wheel steering pattern can be altered simply by changing the cam profile of the cam member to meet requirements for various types of vehicles. For example, the cam member may have such a cam profile that the rear wheels make same phase pivotal movement when the steering wheel is rotated through a relatively small angle, whereas they make opposite phase pivotal movement when the steering wheel is rotated through a relatively large angle. Further, the turning point or timing between the same phase pivotal movement and the opposite phase pivotal movement can be selected as desired. It is of course possible to select a cam profile which will allow only the same phase pivotal movement of the rear wheels.

In addition, the follower support is movable only rectilinearly widthwise of the vehicle, so that any movement of the follower support can be utilized directly for steering the rear wheels. Because of such linearity of movement, further, the follower support can be made compact and mounted in a space saving manner.

Other objects, features and advantages of the invention will be fully understood from the following detailed description given with reference to the accompanying drawings.

BRIEF DESCRIPTION OF THE DRAWINGS

In the accompanying drawings;

FIGS. 3a to 3d are views as seen in the direction of an arrow III in FIG. 1 to show a cam member and associated follower rollers in progressive stages of rear wheel steering;

DETAILED DESCRIPTION

Figure 1:
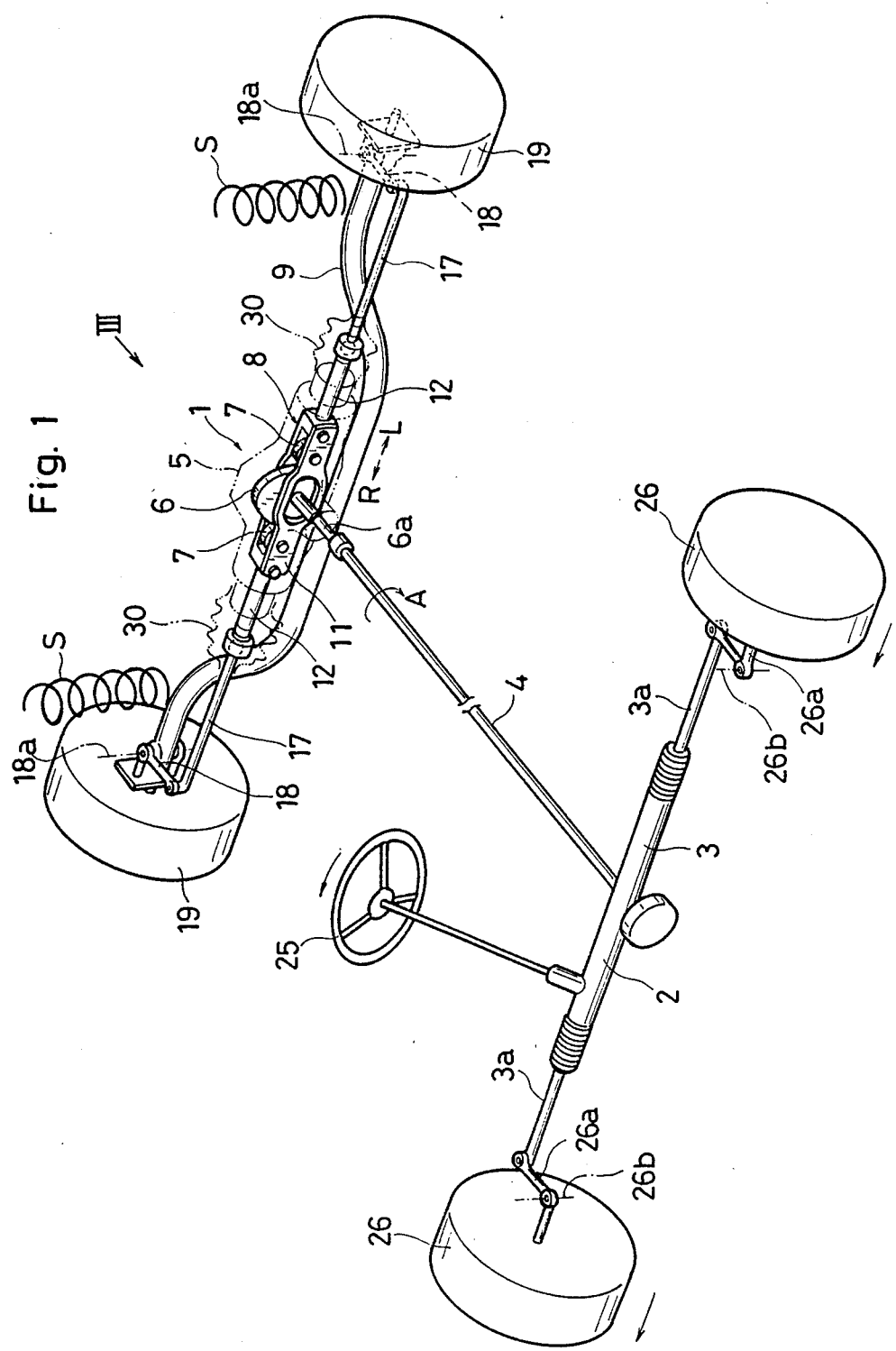
FIG. 1 is a overall perspective view showing a four-wheel steering system which incorporates a rear wheel steering mechanism according to the invention.

Referring to FIG. 1 of the accompanying drawings, there is illustrated a four-wheel steering system which includes a front wheel steering mechanism 2 and a rear wheel steering mechanism 1. The overall steering system may be incorporated into any types of four-wheeled automotive vehicles.

According to the illustrated embodiment, the front wheel steering mechanism 2, which is of the known rack and pinion type, comprises a tubular gear box 3 extending widthwise of the vehicle. Within the gear box 3 is arranged a rack (not shown) in mesh with a drive pinion (not shown) which is rotated by the rotation of a steering wheel 25. The rack is connected to a pair of tie rods 3a each of which in turn is pivotally connected to a knuckle arm 26a of a corresponding front wheel 26. The knuckle arm 26a is pivotable about a vertical axis 26b.

Thus, when the rack is moved widthwise of the vehicle, the two front wheels 26 are identically changed in orientation by pivoting about the vertical axes 26b. Such widthwise movement of the rack is also converted to rotation of a driven pinion (not shown) to supply a drive force to the rear wheel steering mechanism 1 by way of a transmission shaft 4 extending lengthwise of the vehicle. Naturally, this transmission shaft includes universal joints (not shown) in a manner well known for drive transmission. The transmission shaft together with the front wheel steering mechanism 2 is supported on a sprung part or parts, that is, on the side of a vehicle body B (see FIG. 5). The term "sprung part" used above means a part whose load is applied to the wheel suspension system (only rear suspension springs S shown), whereas the term "unsprung part" used hereinafter means a part whose load is supported by the ground and not applied to the suspension system.

The rear wheel steering mechanism 1 mainly comprises a housing 5 extending widthwise of the vehicle, a cam plate 6 accommodated within the housing, and a follower support 8 also accommodated in the housing.

Figure 2:
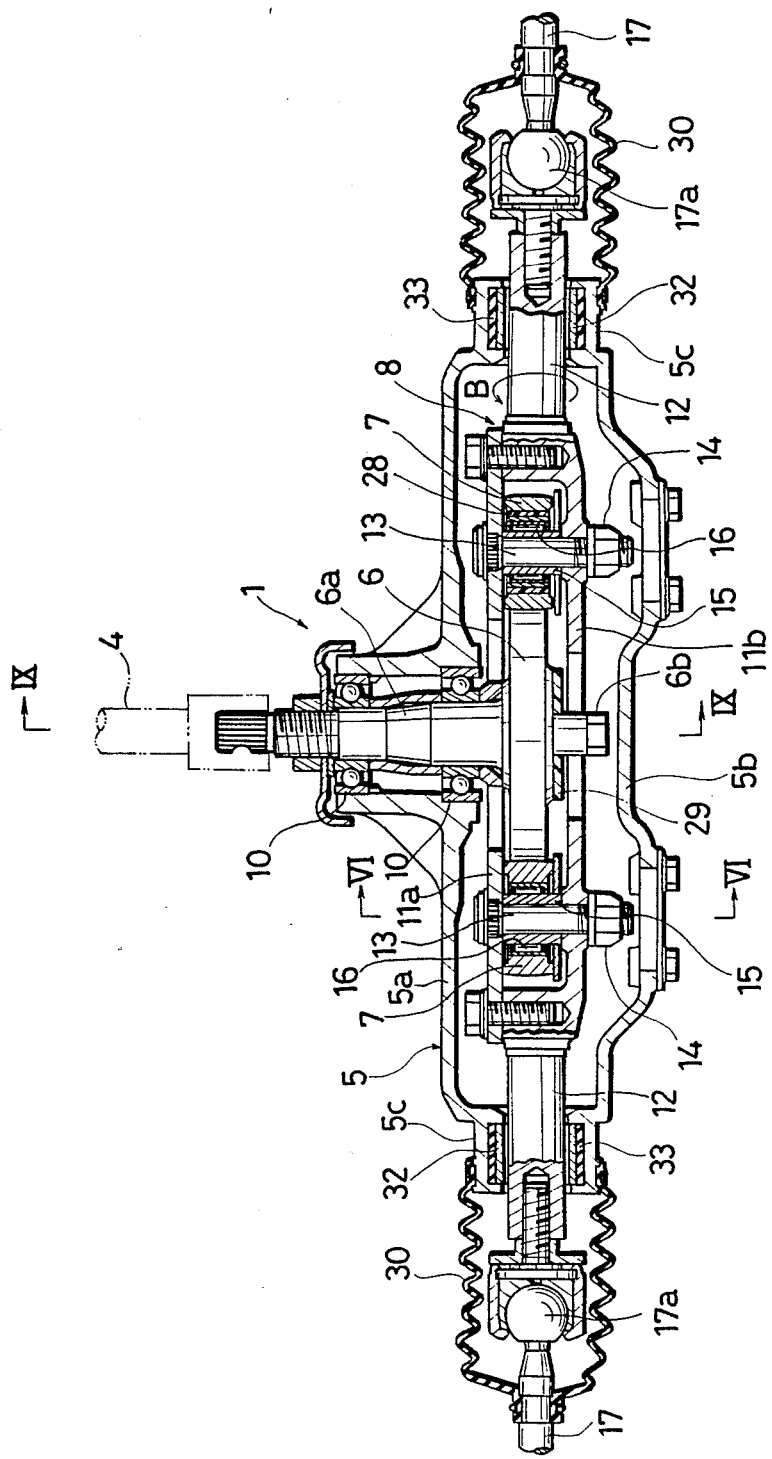
FIG. 2 is an enlarged plan view, in section, showing the interior structure of the rear wheel steering mechanism.

The housing 5 is fixed by a pair of brackets 9a (see FIG. 5) to a rear axle beam 9 which constitutes an unsprung part with respect to the wheel suspension S. As shown in FIG. 2, the housing consists of a front half member 5a and a rear half member 5b joined to the front half member as by bolting (see also FIG. 9).

As also shown in FIG. 2, the cam plate 6 is located centrally within the housing 5 and has an cam shaft 6a connected to the transmission shaft 4 to serve as an input shaft for driving the rear wheel steering mechanism 1. The cam shaft extends lengthwise of the vehicle and is rotatably supported on the housing front half 5a via a pair of bearings 10. The cam plate 6 further has an integral shaft extension 6b which extends rearward.

The follower support 8, which extends widthwise of the vehicle, comprises a support frame 11 rotatably supporting a pair of cam follower rollers 7 with the cam plate 6 interposed therebetween. The follower support further includes a pair of slide rods 12 extending from both ends of the support frame 11.

The support frame 11 consists of a front plate 11a and a rear plate 11b joined to the front plate as by bolting. Each follower roller 7 is rotatably supported on a roller shaft 13 which extends parallel to the input shaft 6a to bridge between the two plates 11a, 11b of the support frame 11. More detailed structure for supporting the roller 7 will be described hereinafter.

Each slide rod 12 extends out of the housing 5 and is slidably guided by a metallic bush 32 which is mounted to a cylindrical end portion 5c of the housing via a rubber bush 33. Thus, the follower support 8 as a whole is rectilinearly movable widthwise of the vehicle when the cam plate 6 is rotated.

The projecting end of each slider rod 12 is connected through a universal joint 17a to a tie rod 17 which in turn is pivotally connected to a knuckle arm 18 of a corresponding rear wheel 19 (see FIG. 1). The joint 17a is surrounded by a bellow 30 which prevents dust entry. The knuckle arm 18 is supported by the rear axle beam 9 to pivot about a vertical axis 18a. Thus, when the follower support 8 together with the tie rod 17 is rectilinearly moved widthwise of the vehicle, such linear movement is converted to steering pivotal movement of the rear wheel 19 by way of the knuckle arm 18.

Obviously, the peripheral profile of the cam plate 6 determines the linear movement of the follower support 8 and the steering movement of the rear wheels 19. Therefore, it is possible to obtain any desired steering pattern by selecting a suitable cam profile for the cam plate 6. According to the illustrated embodiment, the cam plate 6 has the following cam profile although it may have a different profile depending on particular requirements.

In FIG. 3a, the cam plate 6 is shown in its initial position as interposed between the two follower rollers 7. As apparently appreciated, the peripheral profile of the cam plate is symmetrical with respect to a diametrical line (symmetrical line) SL passing through the center 0 of a reference circle RC.

As illustrated in FIG. 3a, the cam plate 6 has a diametrically opposite pair of constant radius surface portions 20 which extend along the reference circle RC for a small angular range and are centrally passed by another diametrical line (neutral line) NL perpendicular to the symmetrical line SL. When the rollers 7 are in contact with the constant radius surface portion 20 at the neutral line NL, the steering wheel 25 is in its neutral steering position.

Above the neutral line NL, each constant radius surface portion 20 is adjoined by a first smaller radius surface portion 21 which allows movement of a corresponding roller 7 toward the reference circle center 0. Below the neutral line NL, on the other hand, the constant radius surface portion 20 is bounded by a first larger radius surface portion 22 which causes movement of the roller 7 away from the center 0. The first smaller radius portion 21 and the first larger radius portion 22 are identical in angular range and reversely correspond to each other in radius variation. Further, the first smaller radius portion 21 and the first larger radius portion 22 on one side of the symmetrical line SL are positioned diametrically opposite the first larger radius portion 22 and the first smaller radius portion 21 on the other side of the symmetrical line, respectively.

The cam plate 6 further includes a second larger radius surface portion 23 continuous with both of the first smaller radius surface portions 21, and a second smaller radius surface portion 24 merging with both of the first larger radius surface portions 22. The second larger radius portion 23 and the second smaller radius portion 24 are positioned diametrically opposite each other and centrally passed by the symmetrical line SL. The second larger radius portion 23 projects to a greater degree than each first larger radius portion 22, while the second smaller radius portion 24 is more recessed than each first smaller radius portion 21. Each end of the second larger radius portion 23 and of the second smaller radius portion 24 is located on the reference circle RC to provide a directional turning point TP.

In operation, when the steering wheel 25 is rotated clockwise (as viewed from the driver) for example to effect rightward pivoting of the front wheels 26, the transmission shaft 4 together with the cam plate 6 is simultaneously caused to rotate in the direction of an arrow A in FIG. 1. FIGS. 3a to 3d show the cam plate 6 at various rotational positions as viewed from behind (as seen in the arrow III direction in FIG. 1).

In FIG. 3a, the cam plate 6 is in its neutral position in which both of the follower rollers 7 contact the constant radius surface portions 20 at the neutral line NL. At the initial stage of cam rotation in the arrow A direction, the rollers 7 still contact the constant radius surface portions 20, as illustrated in FIG. 3b. In this case, the rollers 7 together with the follower support 8 remain in the same position widthwise of the vehicle, so that no steering pivotal movement of the rear wheels 19 will occur. This means that a small angle steering operation will result in steering pivotal movement of the front wheels only, as is the case with a two-wheel steering system (2WS).

As shown in FIG. 3c, upon further rotation of the cam plate 6 in the arrow A direction, one roller 7 (right roller in FIG. 3c) comes into pressing contact with a corresponding first larger radius surface portion 22, whereas the other roller 7 (left roller) is allowed to move into a corresponding first smaller radius surface portion 21. As a result, the follower support 8 is moved rectilinearly in the direction of an arrow R (see FIG. 1), thereby causing the rear wheels 19 to pivot in the same direction (rightward) as the front wheels 26.

As the right roller 7 rides over the corresponding first larger radius surface portion 22, the same phase pivotal angle of the rear wheels 19 increases first and thereafter decreases At the turning point TP, the follower support 8 has returned to its initial neutral position, and the pivotal angle of the rear wheels 19 is again zero.

Upon still further rotation of the cam plate 6 in the arrow A direction, the left roller 7 comes into pressing contact with the second larger radius surface portion 23, while the right roller 7 is allowed by the second smaller radius surface portion to follow the left roller, as shown in FIG. 3d. As a result, the follower support 8 moves linearly leftward as indicated by an arrow L in FIG. 1, thereby causing the rear wheels 19 to pivot in the opposite direction (leftward) relative to the front wheels 26. The opposite phase pivotal angle of the rear wheels 19 increases until the steering wheel 25 is fully rotated to its limit.

Obviously, a similar operation is obtained when the steering wheel 25 is rotated counterclockwise (as viewed from the driver).

Figure 4:
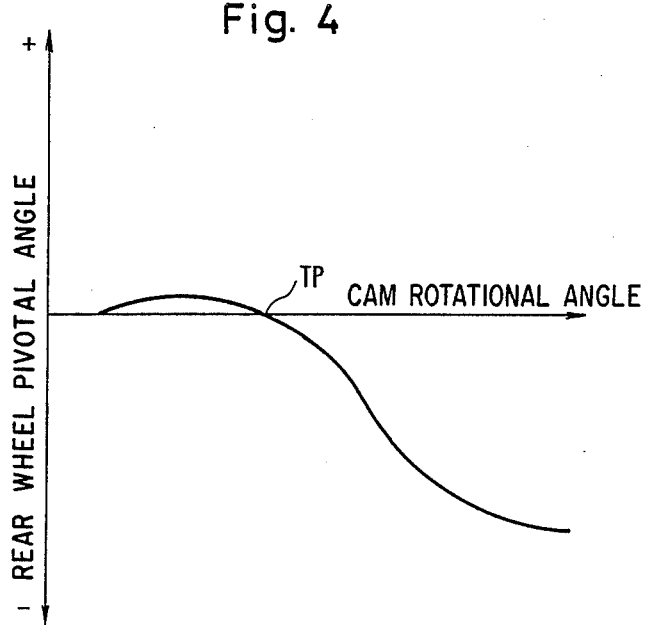
FIG. 4 is a diagram showing the relation between cam rotation and rear wheel steering angle.

FIG. 4 is a diagram showing relation between the rotating angle of the cam plate 6 and the pivotal angle of the rear wheels 19. The symbol "+" represents the same phase pivotal movement of the rear wheels 19, whereas the symbol "−" indicates the opposite phase pivotal movement of the rear wheels 19.

Apparently, the starting point or angle of the same phase pivotal movement can be changed by increasing or decreasing the angular range of the constant radius surface portions 20. The only limitation imposed on the profile of the cam plate 6 is that the two follower rollers 7 are constantly spaced from each other when contacting the cam plate 6. Within this limitation, therefore, the cam plate 6 may be easily redesigned to have different cam profiles which meet various requirements for various types of vehicles. For example, the turning point TP from the same phase pivotal movement to the opposite phase pivotal movement can be changed by adjusting the angular range of each first smaller radius surface portion 21 and each first larger radius surface portion 22, whereas the amounts of the same phase pivotal movement and the opposite phase pivotal movement can be independently altered by changing the amounts of projection of the first and second larger radius surface portions 22, 23. If desired, the opposite phase pivotal movement following the same phase pivotal movement may be obviated.

As described hereinbefore, the same phase pivotal movement of the rear wheels 19 is suitable for high or medium speed driving, while the opposite phase pivotal movement of the rear wheels is preferable for low speed driving. According to the illustrated example, the same phase pivotal movement of the rear wheels is preceded by non-pivoting thereof at the initial stage of rotating the steering wheel 25. Such a steering pattern is advantageous for the following reason.

The same phase pivotal movement of the rear wheels 19 is effective for preventing lateral slippage of the vehicle at the time of running in a gentle curve or conducting a lane change during high speed driving. However, the same phase pivotal movement of the rear wheels simultaneously restrains yawing (rotation about a vertical axis) of the vehicle. In fact, such yawing is required to a certain extent to suitably orient the vehicle for cornering or lane shifting although excessive yawing must be avoided to prevent the vehicle from spinning. The constant radius surface portions 20 of the cam plate 6 ensure non-pivoting of the rear wheels at the initial stage of rotating the steering wheel 25, thereby causing the vehicle to yaw suitably for cornering or lane change. Immediately thereafter, the rear wheels make the same phase pivotal movement to prevent lateral slippage and excessive yawing of the vehicle.

As already described, the transmission shaft 4 for rotationally driving the cam plate 6 is supported on the side of the vehicle body B (FIG. 5) which is a sprung part, whereas the housing 5 together with the follower support 8 inside is supported on the rear axle beam 9 which is an unsprung part. This means that the transmission shaft 4 receives rolling movement of the vehicle body B as its own rotation. Such an arrangement, though not absolutely necessary, enables automatic modification of the rear wheel orientation to improve driving safety.

Figure 5:
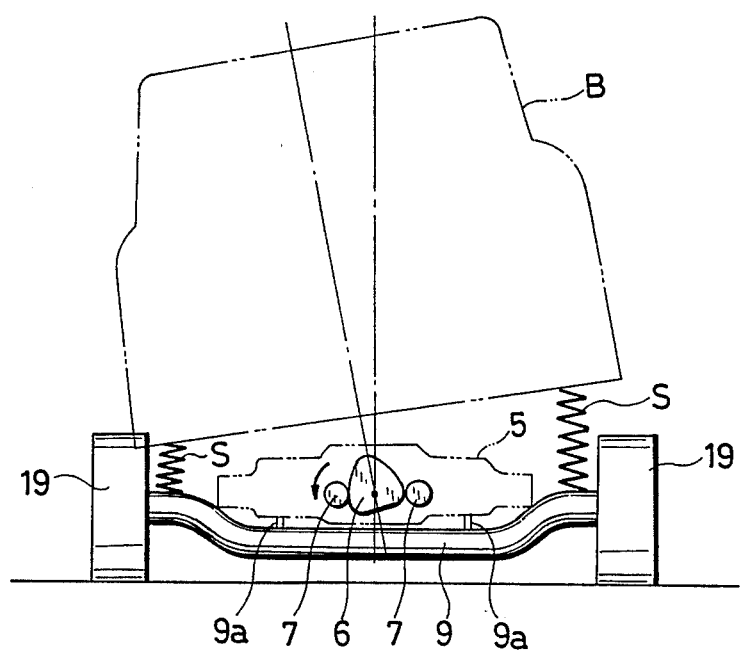
FIG. 5 is a schematic rear view showing how the rear wheel steering mechanism works upon rolling of the vehicle.

As shown in FIG. 5 (vehicle viewed from behind), when turning to the right at high speed for example with the cam plate 6 having been rotated slightly in the arrow A direction (but not to a large extent because of high speed), the vehicle body B is centrifugally rolled to the left. Such rolling of the vehicle body B causes further slight rotation of the cam plate 6 in the arrow A direction, whereas the housing 5 remains non-rotated. As a result, the rear wheels 19 make same phase pivotal movement to produce a larger cornering force without requiring further steering rotation of the steering wheel 25 (FIG. 1).

The degree of vehicle rolling depends on the centrifugal force which in turn is determined by the vehicle speed and the loaded vehicle weight. Usually, the driver is conscious of the vehicle speed but not of the loaded vehicle weight. Thus, the vehicle may be sometimes subjected to a larger centrifugal force than expected by the driver. With a conventional four-wheel steering system, the rear wheels are steered only by the steering operation of the driver, so that he (or she) must often make a skill-taking modification in steering after the vehicle has already slipped laterally The automatic steering modification described above utilizes the vehicle rolling, which varies in degree depending on the loaded vehicle weight, to prevent vehicle lateral slippage without requiring modified steering operation of the driver.

Next, the support structure for each follower roller 7 will be described with reference to FIGS. 6 and 7.

Figure 6:
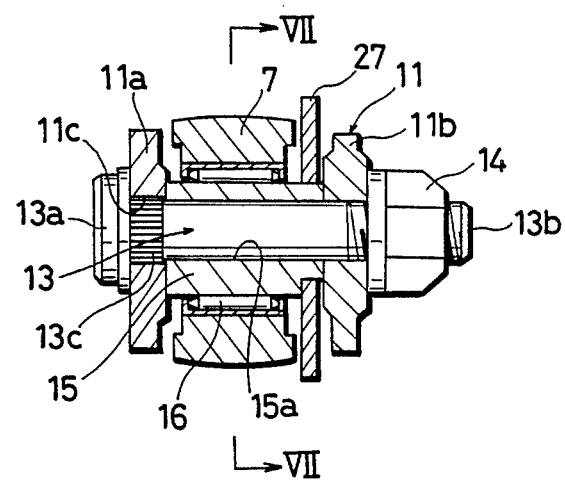
FIG. 6 is a sectional view taken on lines VI—VI in FIG. 2.
Figure 7:
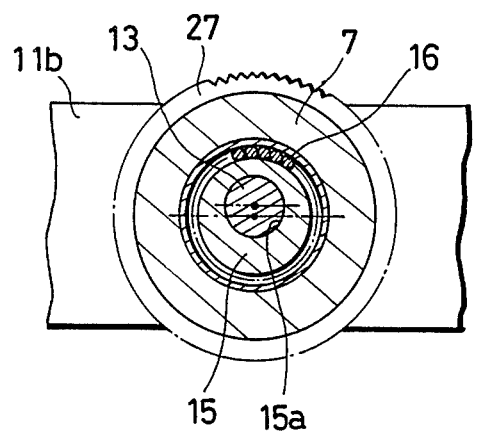
FIG. 7 is a sectional view taken on lines VII—VII in FIG. 6.

As shown in FIGS. 6 and 7 (also in FIG. 1), the roller shaft 13 rotatably supporting each follower roller 7 has an enlarged head 13a at one end and a threaded portion 13b at the other end. The enlarged head 13a comes into abutment with the front plate 11a of the support frame 11, whereas the threaded portion 13b is screwed to a nut 14 which comes into abutment with the rear plate 11b of the support frame. Preferably, the roller shaft has a serrated base portion 13c which is non-rotatably fitted in a correspondingly serrated hole 11c of the front plate 11a, so that the shaft is prevented from rotating when screwing the nut 14.

A bush 15 having an eccentric bore 15a is fitted on the roller shaft 13, and an annular series of bearing rolls or needles 16 is arranged between the bush 15 and the roller 7. Normally, the bush 15 is rotationally fixed relative to the roller shaft 13 by being clamped between the front and rear plates 11a, 11b of the support frame 11. On the other hand, the bush 15 may be rotationally adjusted relative to the roller shaft 13 upon loosening the nut 14. In this way, the rotary axis of the roller 7 is adjustable in position widthwise of the vehicle. Such adjustability compensates for unacceptable backlashes between the roller 7 and the cam plate 6 resulting from abrasion. Further, the positional adjustability of the roller 7 will also allow production errors of the cam plate 6 to a certain extent.

According to the example illustrated in FIGS. 6 and 7, the eccentric bush 15 is provided with a discal operating plate 27 for integral rotation therewith to facilitate positional adjustment of the roller 7. As illustrated in FIG. 7, the discal operating plate 27 may be externally knurled for further convenience of adjustment.

Positional adjustability may be provided for both of the two follower rollers 7. However, it suffices to provide such adjustability only with respect to one of the follower rollers.

As illustrated in FIG. 2, at least one of the two follower rollers 7 may be provided internally with a rubber ring 28 surrounding the bearing 16. This rubber ring is advantageous in the following two respects.

Firstly, the distance between the two rollers 7 is slightly variable by elastic deformation of the rubber ring 28. Therefore, no jamming or cogging occurs during rotation of the cam plate 6 in contact with the rollers 7 even if the cam profile has surface irregularities. Further, the cam plate 6 may be produced with a relatively large tolerance.

Secondly, the rollers 7 may be initially mounted in prestressed contact with the cam plate 6 to avoid unacceptable play therebetween during rear wheel steering. Such manner of mounting also compensates for backlashes resulting from abrasion, thereby ensuring smooth operation at all times.

Figure 8:
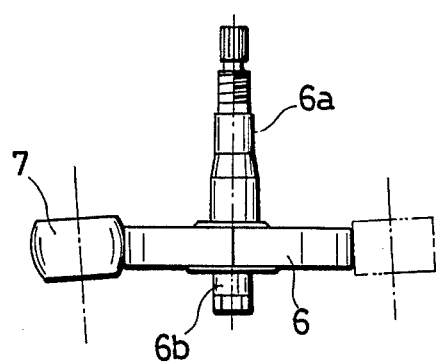
FIG. 8 is a plan view showing how the cam member contacts the follower rollers when they are mounted somewhat erroneously.

Preferably, each follower roller 7 has a circumferential contacting surface which is rounded or crowned in cross section, as shown in FIG. 8. Such a configuration ensures that the roller comes in contact with the flat circumferential surface of the cam plate 6 even if the rotary axes of the roller and the cam plate are not parallel due for example to mounting errors. On the other hand, a roller with a flat circumferential surface (shown in phantom lines in FIG. 8) will come into contact with a circumferential edge of the cam plate, consequently accelerating local abrasion and impairing smoothness of operation.

Figure 9:
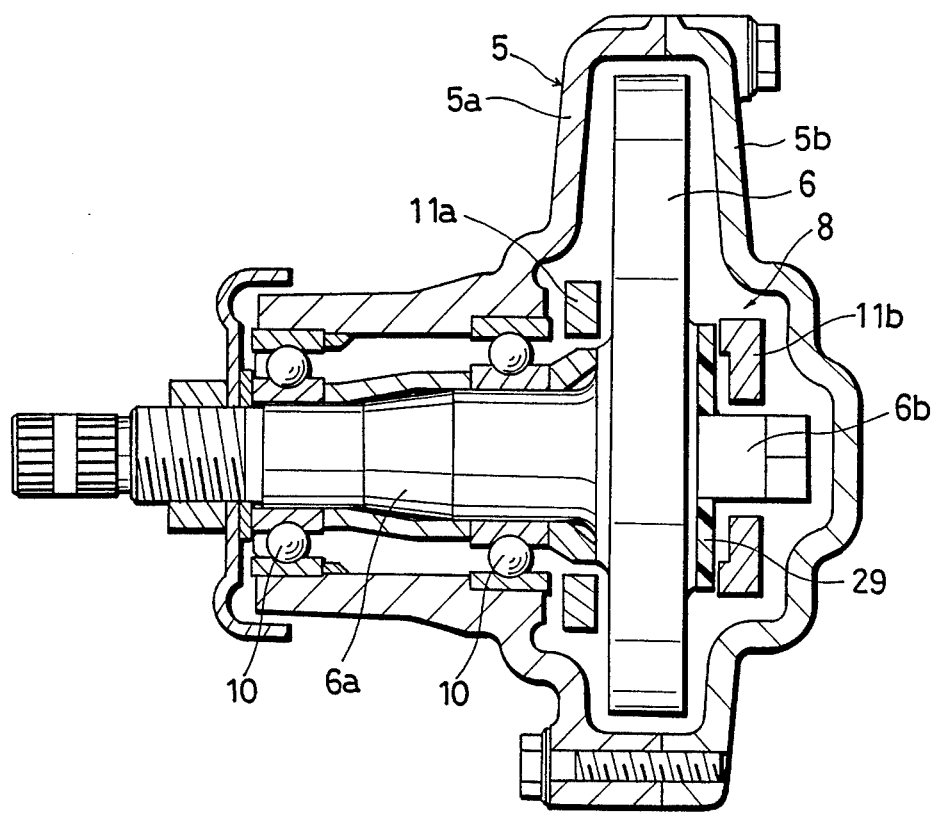
FIG. 9 is an enlarged sectional view taken on lines IX—IX in FIG. 2.

As illustrated in FIGS. 2 and 9, a discal stopper plate 29 made of a hard resin is fixed as by an adhesive to the cam plate 6 to face the rear plate 11b of the support frame 11 with a slight clearance. This stopper plate comes into contact with the rear plate 11b to prevent rotation of the follower support 8 about a horizontal axis extending widthwise of the vehicle (see an arrow B in FIG. 2).

The rotation of the follower support 8 will occur when the tie rods 17 are rotated by the forces acting on the rear wheels 19. The follower support 8 thus rotated may unacceptably interfere with the housing 5 or the cam plate 6, so that the support cannot make smooth sliding movement. Further, such interference may produce objectionable noises. In an extreme case, the bellows 30 may be unduly torsioned to break. The stopper plate 29 can prevent any problems which may arise from unacceptable rotation of the follower support 8.

The small clearance between the stopper plate 29 and the frame rear plate 11b ensures smooth movement of the follower support 8 when it is not rotated.

The stopper plate 29 may be made of a metallic material with a lubricating oil applied to its contact surface. Alternatively, the stopper 29 may be made of an elastic material to absorb impacts upon contact with the frame rear plate 11b.

Figure 10:
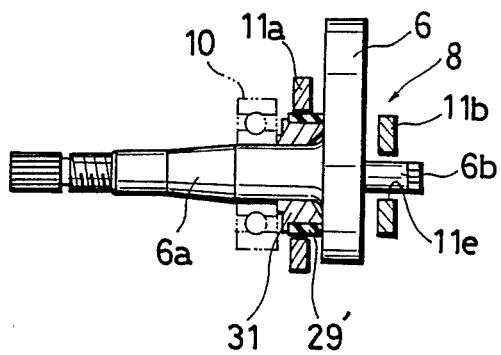
FIG. 10 a sectional side view showing a principal portion of another rear wheel steering mechanism embodying the invention.
Figure 11:
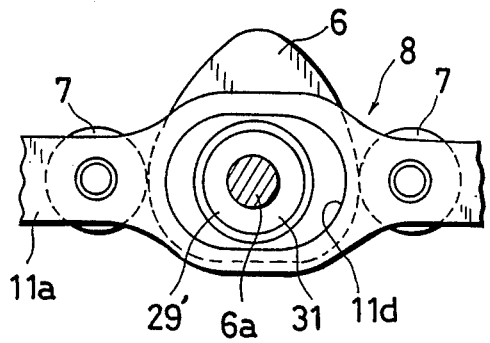
FIG. 11 is a front view showing the same principal portion of the embodiment illustrated in FIG. 10.

FIGS. 10 and 11 show another stopper 29' for preventing the follower support 8 from rotating about a horizontal axis extending widthwise of the vehicle. Specifically, the stopper 29' which is made of an elastic material is cylindrical and fitted on an annular spacer 31 which in turn is fixed on the input shaft 6a at an elongated opening 11d of the frame front plate 11a. The stopper may also be made of a hard resin or a metallic material. Incidentally, the elongated opening 11d is necessary to allow movement of the follower support 8 widthwise of the vehicle irrespective of the provision of the stopper 29'. Similarly, the frame rear plate 11b is also formed with an elongated opening 11e.

Figure 12:
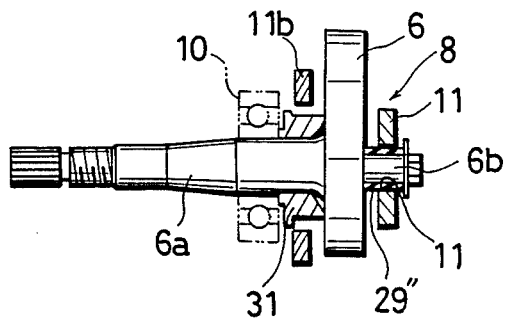
FIG. 12 is a sectional side view showing still another rear wheel steering mechanism embodying the invention.

FIG. 12 shows still another stopper 29" which is fitted on the shaft extension 6b at the elongated opening 11e of the frame rear plate 11b.

The invention being thus described, it is obvious that the same may be varied in many other ways. For instance, the transmission shaft 4 may be obviated, and the input or cam shaft 6a may be driven by an electric motor which is controlled in dependence upon rotational angle of the steering wheel 25 and the vehicle speed. Further, the follower support 8 may have a different configuration. Such variations are not to be regarded as a departure from the spirit and scope of the invention, and all such modifications as would be obvious to those skilled in the art are intended to be included within the scope of the following claims.

I claim:

1. A steering mechanism for vehicle rear wheels comprising:
    an input shaft rotated in response to rotation of a vehicle steering wheel,
    a cam member connected to said input shaft for rotation therewith,
    a follower support for holding a pair of cam follower rollers spaced widthwise of the vehicle with said cam member interposed therebetween, said support being rectilinearly movable widthwise of the vehicle when said input shaft is rotated, each of said cam follower rollers being rotatably supported on said follower support by means of a roller shaft extending perpendicularly to the widthwise direction of the vehicle, and
    a tie member connecting said follower support to a knuckle arm of each rear wheel,
    wherein an eccentric bush is interposed between at least one of said cam follower rollers and a corresponding shaft so that said one follower roller is adjustable in position relative to said corresponding roller shaft by rotation of said bush.

2. The steering mechanism as defined in claim 1, wherein said eccentric bush is provided with operating means for facilitating rotation thereof relative to said corresponding roller shaft.

3. The steering mechanism as defined in claim 2, wherein said operating means is in the form of a discal plate having a knurled outer circumferential surface.

4. The steering mechanism as defined in claim 1, wherein an elastic ring is interposed between at lest one of said follower rollers and a corresponding roller shaft.

5. The steering mechanism as defined in claim 1, wherein each of said cam follower rollers has an outer circumferential surface which is rounded in cross section.

6. A steering mechanism for vehicle rear wheels comprising:
    an input shaft rotated in response to rotation of a vehicle steering wheel,
    a cam member connected to said input shaft for rotation therewith,
    a follower support for holding a pair of cam followers spaced widthwise of the vehicle with said cam member interposed therebetween, said support being rectilinearly movable widthwise of the vehicle when said input shaft is rotated,
    a stopper means for preventing said follower support from rotating about an axis extending widthwise of the vehicle, and
    a tie member connecting said follower support to a knuckle arm of each rear wheel.

7. The steering mechanism as defined in claim 6, wherein said stopper means is arranged between said cam member and said follower support.

8. The steering mechanism as defined in claim 6, wherein said stopper means is arranged between said input shaft and said follower support.

9. A steering mechanism for vehicle rear wheels comprising:
    an input shaft rotated in response to rotation of a vehicle steering wheel,
    a cam member connected to said input shaft for rotation therewith,
    a follower support for holding a pair of cam followers spaced widthwise of the vehicle with said cam member interposed therebetween, said support being rectilinearly movable widthwise of the vehicle when said input shaft is rotated, and
    a tie member connecting said follower support to a knuckle arm of each rear wheel, wherein said input shaft extends lengthwise of the vehicle for rotation with a vehicle body upon rolling thereof, and said follower support is slidably supported in a housing which is fixed on an unsprung part connected to said vehicle body through a wheel suspension.

10. The steering mechanism as defined in claim 9, wherein said input shaft is mechanically connected to said vehicle steering wheel.

11. A steering mechanism for vehicle rear wheels comprising:
    an input shaft rotated in response to rotation of a vehicle steering wheel,
    a cam member connected to said input shaft for rotation therewith and having a cam profile which is symmetrical with respect to a diametrical line providing a symmetrical line,
    a follower support for holding a pair of cam followers spaced widthwise of the vehicle with said cam member interposed therebetween, said support being rectilinearly movable widthwise of the vehicle when said input shaft is rotated, said pair of cam followers being caused by said cam profile to move simultaneously in the same direction substantially by the same amount,
    a tie member connecting said follower support to a knuckle arm of each rear wheel,
    wherein said cam profile includes a diametrically opposite pair of constant radius surface portions centrally passed by another diametrical line perpendicular to said symmetrical line, a larger radius surface portion continues with one end of each constant radius surface portion, and a smaller radius surface portion continuous with the other end of each said constant radius surface portion.

12. The steering mechanism as defined in claim 11, wherein said cam profile further includes a second smaller radius surface portion continuous with said larger radius surface portion, and a second larger radius surface portion continuous with the first-mentioned smaller radius surface portion.

13. The steering mechanism as defined in claim 13, wherein said follower support is accommodated in and slidably guided by a housing which extends widthwise of the vehicle.

14. The steering mechanism as defined in claim 13, wherein said follower support comprises a support frame extending widthwise of the vehicle and carrying said pair of cam followers, and a slide rod extending from each end of said support frame to slidably project out of said housing for connection to said tie member.

* * * * *